(12) United States Patent
Biester et al.

(10) Patent No.: US 7,007,922 B2
(45) Date of Patent: Mar. 7, 2006

(54) ROTATING REGULATING DEVICE

(75) Inventors: Klaus Biester, Wienhausen (DE); Norbert Lenz, Celle (DE)

(73) Assignee: Cooper Cameron Corporation, Houston, TX (US)

( * ) Notice: Subject to any disclaimer, the term of this patent is extended or adjusted under 35 U.S.C. 154(b) by 151 days.

(21) Appl. No.: 10/415,511

(22) PCT Filed: Oct. 30, 2001

(86) PCT No.: PCT/EP01/12554

§ 371 (c)(1),
(2), (4) Date: Sep. 3, 2003

(87) PCT Pub. No.: WO02/37008

PCT Pub. Date: May 10, 2002

(65) Prior Publication Data

US 2004/0021105 A1  Feb. 5, 2004

(30) Foreign Application Priority Data

Oct. 30, 2000 (DE) .......................... 200 18 548 U

(51) Int. Cl.
*F16K 31/02* (2006.01)

(52) U.S. Cl. ................. 251/129.11; 251/266; 251/292; 251/304

(58) Field of Classification Search ........... 251/129.11, 251/266, 291, 292, 304; 74/57, 59, 89.23, 74/89.45, 424.71
See application file for complete search history.

(56) References Cited

U.S. PATENT DOCUMENTS

| | | | | |
|---|---|---|---|---|
| 2,953,344 A | | 9/1960 | Yancey ......................... | 251/58 |
| 3,771,918 A | * | 11/1973 | Winter ....................... | 417/266 |
| 4,350,322 A | * | 9/1982 | Mueller ....................... | 251/229 |
| 4,436,280 A | * | 3/1984 | Geisow ....................... | 251/229 |
| 4,565,213 A | | 1/1986 | Giebeler ...................... | 137/494 |
| 5,195,721 A | * | 3/1993 | Akkerman ............. | 251/129.13 |
| 6,007,047 A | | 12/1999 | Phipps ........................ | 251/252 |
| 6,446,660 B1 | * | 9/2002 | Goni Usabiaga ........ | 137/243.6 |

FOREIGN PATENT DOCUMENTS

| | | |
|---|---|---|
| DE | 4 92 021 | 2/1930 |
| DE | 5 14 986 | 12/1930 |

(Continued)

OTHER PUBLICATIONS

German Search Report for Appln. No. 200 18 548.9; Dated May 7, 2001 (pp. 4).

*Primary Examiner*—Edward K. Look
*Assistant Examiner*—John K. Fristoe, Jr.
(74) *Attorney, Agent, or Firm*—Conley Rose, P.C.

(57) ABSTRACT

The invention relates to a rotating regulating device, especially for a valve comprising a pivotable or rotatable valve body. Said device comprises at least one actuating device for rotating a regulating element which can be connected to the valve body in a moveable manner. The aim of the invention is to improve one such rotating regulating device in such a way that in its precise and reproducible, and can be especially automatically actuated. In order to achieve this, the regulating element is a rotating collar which is rotationally positioned in relation to a bearing collar, and the actuating device comprises at least one mechanism which converts a linear movement into a rotational movement.

27 Claims, 3 Drawing Sheets

FOREIGN PATENT DOCUMENTS

| | | |
|---|---|---|
| DE | 1 525 323 | 3/1966 |
| DE | 196 39 476 | 9/1996 |
| DE | 195 28 081 | 2/1997 |
| DE | 195 48 593 | 7/1997 |
| EP | 0 050 466 | 4/1982 |
| EP | 0 622 574 A2 | 11/1994 |
| EP | 10 24 422 | 8/2000 |
| GB | 6 25 580 | 7/1946 |
| GB | 1001629 | 8/1965 |
| NL | 112253 | 12/1965 |

* cited by examiner

ROTATING REGULATING DEVICE

BACKGROUND OF THE INVENTION

The invention pertains to a rotary adjusting device, in particular for valves that have a pivoting or twisting valve body, with at least one activating device to rotate an adjusting element that can be connected to the valve body with a positive-motion connection.

A rotary adjusting device of this type is known from practice for example for various valves in the field of oil extraction. Such valves have a ball-shaped or disk-shaped valve body that is mounted in a core chamber so that it can pivot or twist. Depending on the position of the valve body, more or less fluid can pass through the core chamber. The corresponding valve body is connected for example at one place on its circumference with a pivot pin, which is mounted so that it can turn in the valve housing. In manually operated valves for example, an operating lever or wheel as the activating device is connected to and moves with this pivot pin as the adjusting element.

Such manual rotary adjusting devices for valves are especially disadvantageous when they are located underwater in the ocean. In that case such a rotary adjusting device can be operated only with difficulty, and this requires a considerable expenditure of manpower and time. Furthermore, with these manual rotary adjusting devices the actual position of the valve body can only be determined and set inexactly and cannot be reproduced well.

BRIEF SUMMARY OF THE PREFERRED EMBODIMENTS

The invention is therefore based on the task of improving a rotary adjusting device of the type named at the beginning in such a way that it can be operated precisely and reproducibly, and in particular automatically.

This task is solved in connection with the characteristics of the main concept of claim 1 by the fact that the adjusting element is a rotary sleeve which is mounted so that it can twist relative to a bearing sleeve, and the activating device has at least one transmission which translates a linear motion into a rotary motion.

The transmission is connected to and driven by a suitable actuator or by a stepper motor, and translates an appropriate linear motion of the actuator or stepper motor into a rotary motion of the rotary sleeve as the adjusting element. The corresponding twisting of the rotary sleeve is translated through the moving connection to the valve body into a corresponding pivoting or twisting of the valve body, and hence into a corresponding opening or closing of the valve.

In order to be able to use such a rotary adjusting device in a simple manner with conventional valves and conventional actuators or the like, the rotary adjusting device can be designed as a built-in module. This can be flange-mounted for example between the actuator and the valve.

With the relative positioning of the rotary sleeve and the bearing sleeve, the rotary sleeve can be mounted so that it can rotate on an outer surface of the bearing sleeve, or at least outside of the bearing sleeve. In an additional possibility, the rotary sleeve can be mounted inside the bearing sleeve so that it can at least rotate. With the arrangement inside the bearing sleeve, the rotary sleeve is protected thereby and needs essentially no mounting or fastening of its own outside of the rotary adjusting device.

A simple possibility for mounting the rotary sleeve in the bearing sleeve so that it can rotate consists in placing ball and/or roller bearings between them.

In order to rotate the rotary sleeve relative to the bearing sleeve, the rotary sleeve and the bearing sleeve can each have in their circumferential surfaces at least one guide slot, one of them running essentially in a straight line and the other essentially diagonally to the longitudinal direction of the sleeve, with a meshing element of the transmission engaging both slots. If this meshing element moves along both slots, because of the oblique orientation of the two slots a movement of the meshing element in the longitudinal direction of both sleeves is translated into a corresponding rotating motion of the rotary sleeve. In this configuration either the straight-line guide slot or the one which runs diagonally to the longitudinal direction can be formed in the rotary sleeve, and accordingly the other guide slot can be in the bearing sleeve.

It is possible for the guide slots in the rotary sleeve and the bearing sleeve to be located in circumferential surfaces of the sleeves opposite each other. That is, the guide slot in the rotary sleeve for example can be located on one side, and the guide slot in the bearing sleeve can be opposite it.

However, for ease of producing and coordinating the guide slots it can be considered advantageous for them to be located in the rotary sleeve and the bearing sleeve in circumferential surfaces of the sleeves which face each other, that is, on one side of the longitudinal direction.

An additional improvement can be made to the rotating ability of the rotary sleeve relative to the bearing sleeve by forming the guide slots in pairs in the rotary sleeve and guide sleeve, with each pair of guide slots in the respective sleeve lying diametrically opposite each other in the circumferential surface.

For reasons of simplicity of manufacturing, the guide slots can be of essentially equal length as projected on the longitudinal direction of the sleeves.

Improved and simplified rotating ability of the rotary sleeve can be achieved by having its guide slots run in a spiral; that is, by having the guide slots which run diagonal to the longitudinal direction formed in the rotary sleeve.

A meshing element of simple technical design can consist of a meshing pin that is perpendicular to the longitudinal direction.

The design of the guide slots can be simplified in such a way that they continue to be of equal width, so that both end sections of the meshing pin are engaged in the pairs of opposing guide slots in both the rotary sleeve and the bearing sleeve.

So as not to guide the meshing pin directly in the guide slots, the meshing pin can be encircled by ball and/or roller bearings in the area of the guide slots.

The guide slots and the meshing pin constitute parts of the transmission in accordance with the invention. To simplify shifting of the meshing pin in the longitudinal direction of the sleeves, and thus in the longitudinal direction of the guide slots, the meshing pin can be held essentially in its middle section so that it cannot turn, in a feed element which is mounted so that it can slide along a longitudinal bore in the rotary sleeve. This feed element constitutes an additional part of the transmission.

To make it possible to twist the rotary sleeve easily relative to the feed element while at the same time guiding the rotary sleeve, the feed element and the longitudinal bore can have at least a partially circular cross section. In this connection it is also advantageous for the feed element in particular to have a completely circular cross section everywhere except in the area where it holds the middle section of the meshing pin.

To easily move the feed element and thus the meshing pin in the longitudinal direction of the sleeves, the feed element can be removably attached to an operating element of an actuator device. Such an actuator device is known for example from EP 1024422A1. By means of such an actuator device the operating element can be slid into and out of a corresponding actuator housing under electrical control. Because of the detachable connection between the operating element and the feed element, the corresponding linear movement of the operating element is transferred to the feed element and thus to the meshing pin.

In order to be able to fasten the modular rotary adjusting device easily to a corresponding actuator device, the bearing sleeve can have a ring flange extending outward radially on at least one attaching end, which ring flange can be detachably connected to a connecting end of the actuator device.

In order to close the rotary adjusting device as far as possible opposite the ring flange of the bearing sleeve, there can be a closing ring with a ring flange extending outward radially, removably attached to the bearing sleeve opposite the attaching end.

In this connection, in order to be able to ensure that the rotary sleeve can indeed rotate, but to make it as immobile as possible axially, at least one thrust bearing can be placed between the rotary sleeve and the closing ring to fix the rotary sleeve axially relative to the bearing sleeve.

In order to make it possible to mount the rotary sleeve also opposite the closing ring, at least one thrust bearing can be placed between the ring flange of the bearing sleeve and the rotary sleeve, and/or between the connecting end of the actuator device and the rotary sleeve.

To support the return of the rotary sleeve to its starting position, the meshing pin and/or the feed element can be subjected to force in the direction of the ring flange of the bearing sleeve.

A force-loading of this sort can be achieved easily by placing at least one spring element in or against the rotary adjusting device.

A simple possibility for arranging the spring element can consist in placing it so that it can operate between the ring flange and the meshing pin. In this case it can be placed either between the ring flange of the closing ring or the ring flange of the bearing sleeve and the meshing pin. In the one case the spring would have to be a compression spring, and in the other case a tension spring.

In order to be able to position the spring easily when assembling the rotary adjusting device, a spring bearing sleeve can be placed on the bearing sleeve so that it can move in the longitudinal direction, engaging the ends of the meshing pin, and with a terminating flange which extends outward radially; a compression spring is placed between this flange and the ring flange of the closing ring as a spring element.

In order to be able to easily define a starting or ending position of the spring bearing sleeve relative to the rotary adjusting device, the terminating flange can be touching the ring flange of the bearing sleeve in an end position of the spring bearing sleeve.

In order to be able to install the spring bearing sleeve easily when assembling the rotary adjusting device, the spring bearing sleeve can have two longitudinal slots which are open in the direction of the terminating flange; the ends of the meshing pin engage these slots and are in contact with the slot ends which are opposite the terminating flange.

BRIEF DESCRIPTION OF THE DRAWINGS

The following section describes in greater detail an advantageous exemplary implementation of the invention on the basis of the figures included in the drawing.

The figures show the following.

DETAILED DESCRIPTION OF THE PREFERRED EMBODIMENTS

Figure 1:
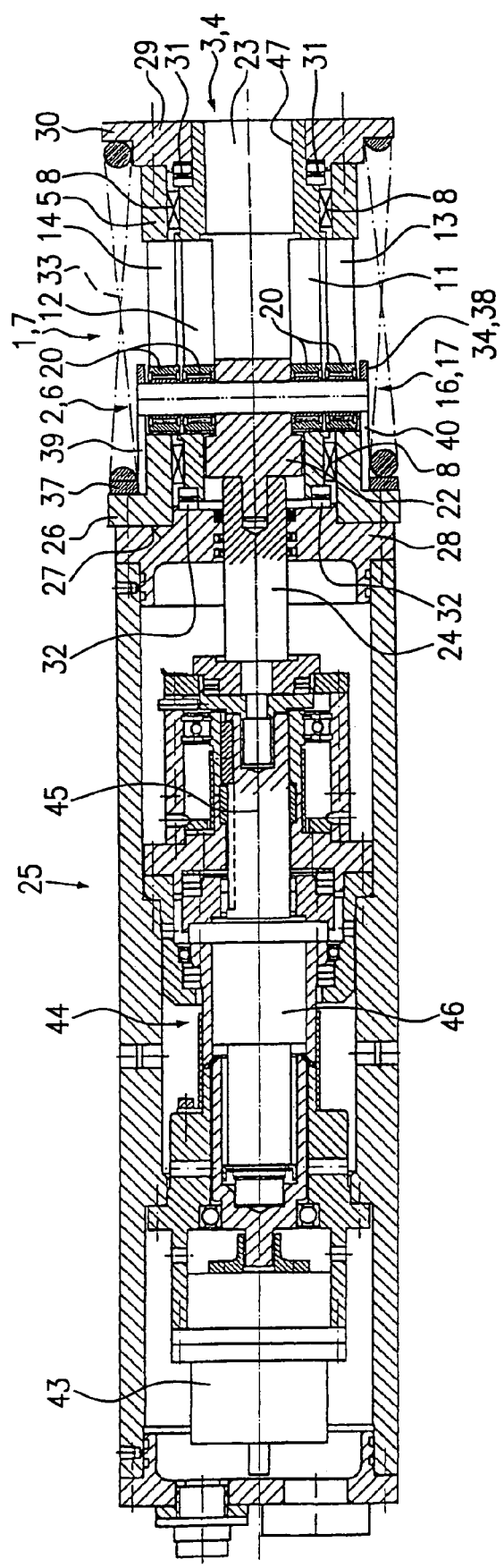
FIG. 1 a longitudinal sectional view through a rotary adjusting device in accordance with the invention, which is removably connected to an actuator device.

FIG. 1 shows a longitudinal sectional view through a rotary adjusting device 1 in accordance with the invention. It is designed as an installed module 7 and flange mounted to one attaching end 27 of an actuator device 25.

The actuator device 25 comprises at least one electro motor 43. This drives a ball screw 44, with a ball nut 46 that can be turned by the electro motor 43. The ball nut 46 can rotate, but is mounted in the actuator device 25 so that it cannot move axially. Turning the ball nut 46 causes a recirculating ball spindle 45 of the ball screw 44 to be repositioned in the longitudinal direction of the actuator device 25. An operating element 24 which is connected to the recirculating ball spindle 45 is repositioned accordingly, and thus likewise a feed element 22 of the rotary adjusting device 1.

The feed element 22 is mounted in a longitudinal bore 23 of a rotary sleeve 4 of the rotary adjusting device 1 in such a way that it can be shifted. The rotary sleeve 4 is mounted in the interior of a bearing sleeve 5 by means of ball and/or rotor bearings 8 so that it can rotate. The bearing sleeve 5 is removably attached, at its attaching end 27 that faces the connecting end 28 of the actuator device 25, to the actuator device 25. On its attaching end 27 the bearing sleeve 5 has a ring flange 26 which extends outward radially. On its end opposite the attaching end 27, the bearing sleeve 5 is connected to a closing ring (29). The latter has a ring flange 30 that also extends outward radially.

The rotary sleeve 4 is mounted so that it can rotate but cannot shift axially relative to the closing ring 29 which is connected to the bearing sleeve 5, by means of the thrust bearing 31, and likewise at the connecting end 28 of the actuator device 25 by means of the thrust bearing 32.

To translate the linear motion of the operating element 24 into a rotary motion of the rotary sleeve 4 relative to the bearing sleeve 5, a transmission 6 is positioned between the two as an activating device 2. The transmission 6 comprises the feed element 22, a meshing pin 17 as meshing element 16, ball or roller bearings 20, and guide slots 11, 12 in the rotary sleeve 4 as well as guide slots 13, 14 in the bearing sleeve 5.

A middle section 21 (see FIG. 2) of the meshing pin 17 is held in the feed element 22, and end sections 18, 19 which protrude out of the feed element (again see FIG. 2) are equipped with ball or roller bearings 20. These end sections 18, 19 are each mounted with a ball or roller bearing 20 in the various guide slots 11 to 14 so that they can move in the longitudinal direction 15 of the rotary adjusting device 1.

The guide slots 13, 14 of the bearing sleeve 5 run in a straight line in the longitudinal direction 15, whereas the guide slots 11,12 in the rotary sleeve 4 run diagonally to the longitudinal direction 15 and in particular in a spiral pattern.

Figure 2:
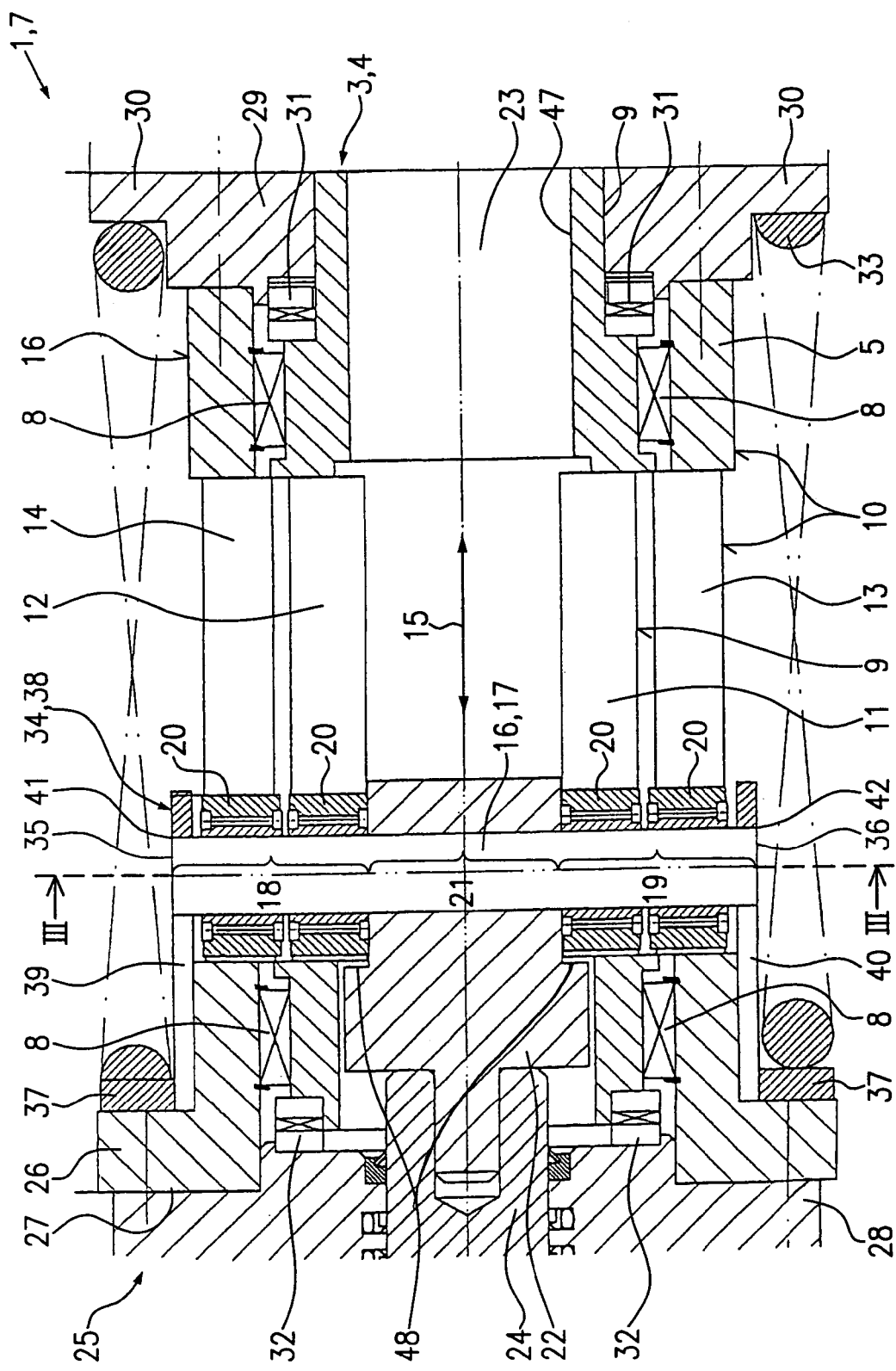
FIG. 2 an enlarged illustration of the exemplary implementation of the rotary adjusting device in accordance with the invention as shown in FIG. 1, and FIG. 3 a sectional view along the line III—III in FIG. 2.

The meshing pin 17 engages longitudinal slots 39, 40 of a spring bearing sleeve 34 with its outermost ends 35, 36; see also FIG. 2. These longitudinal slots are open in the direction of the ring flange 26 of the bearing sleeve 5. In the area of the ring flange 26 the spring bearing sleeve 34 also has a terminating flange 37, which is in contact with the ring flange 26 when the spring bearing sleeve 34 is in the end position 38 shown in FIG. 1. Between the terminating flange 37 and the ring flange 30 of the closing ring 29 there is a compression spring as spring element 33. This applies pressure to the activating device 2 of the rotary adjusting device 1 counter to the adjustment direction of the operating element 24.

In FIG. 2 the rotary adjusting device 1 from FIG. 1 is shown enlarged. In this figure, as in FIG. 3, equivalent parts are given the same reference symbols as in FIG. 1, and only part of them are mentioned.

In FIG. 2 it can be recognized in particular that ends 35, 36 of the meshing pin 17 are in contact with slot ends 41, 42 of the longitudinal slots 39, 40, with the slot ends 41, 42 delimiting the longitudinal slots 39, 40 opposite the terminating flange 37 in the spring bearing sleeve 34. The meshing pin 17 is in contact inside the guide slots 11 to 14 with their ends that are closer to the actuator device 25. The end sections 18, 19 of the meshing pin 17 are encircled by the ball or roller bearings 20, which roll inside of the guide slots 11 to 14 when the meshing pin 17 is moved in the longitudinal direction 15 of the rotary adjusting device 1.

The guide slots 11, 12 and 13, 14 have essentially the same length when projected on the longitudinal direction 15, but the guide slots 11, 12 run in a spiral pattern and the guide slots 13, 14 run in a straight line.

The middle section 21 of the meshing pin 17 is gripped by the feed element 22 and is held in the latter so that it cannot turn. The feed element 22 has a shoulder 48 which extends outward radially and partly overlaps the ball or roller bearings 20 which run in the guide slots 11, 12. Moving the feed element 22 in the direction of the closing ring 29 by means of the operating element 24 of the actuator device 25 causes the meshing pin 17, as the meshing element 16, to move along the guide slots 11, 12 to their ends which are toward the closing ring 29. At the same time the meshing pin 17 moves along the linear guide slots 13, 14 of the bearing sleeve 5, which is firmly connected to the actuator device 25. Because of the spiral form of the other guide slots 11, 12 of the rotary sleeve 4, when the meshing pin 17 is moved along the guide slots 13, 14 and because the meshing pin 17 at the same time engages the guide slots 11, 12, the rotary sleeve 4 is rotated by a corresponding angle. The angle of rotation then comes from the oblique path of the guide slots 11, 12 relative to the guide slots 13, 14.

The rotary sleeve 4 functions in this connection as an adjusting element 3, especially for a valve body of a valve which is not shown in the figures. In particular, a push-in end 47 of the rotary sleeve 4 engages a corresponding connecting element which is connected to the valve body, so that a rotation of the rotary sleeve 4 can be transferred to the valve body to open or close the valve.

Figure 3:
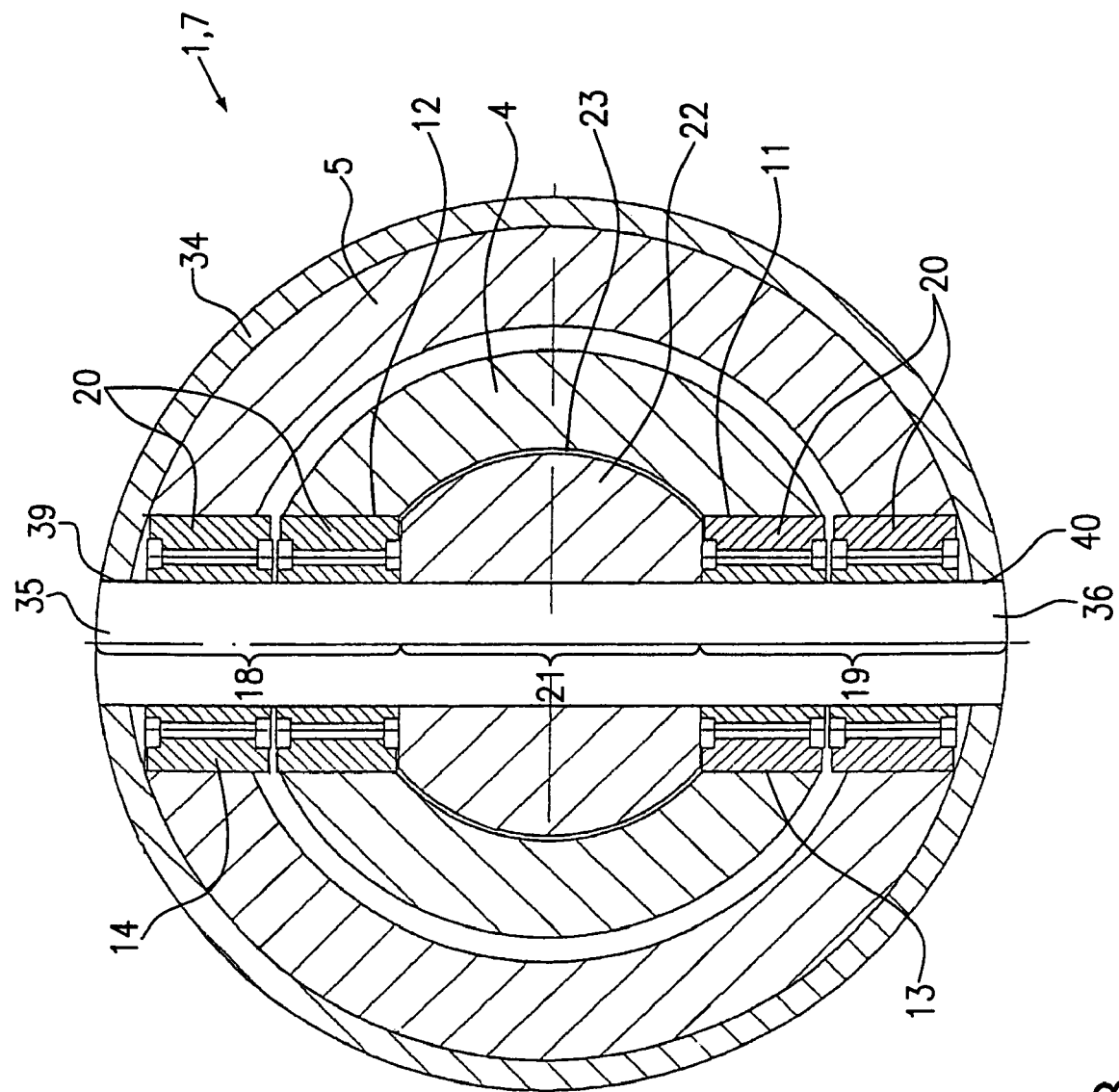

FIG. 3 shows a sectional view along the line III—III in FIG. 2

The spring bearing sleeve 34 surrounds the bearing sleeve 5 and rotary sleeve 4 in its interior essentially completely. The meshing pin 17 has its ends 35, 36 located in the area of the longitudinal slots 39, 40, with the surfaces of the ends 35, 36 flush with the circumferential surface of the spring bearing sleeve 34.

Bearing sleeve 5 and rotary sleeve 4 have a circular cross section, which is interrupted by the respective guide slots 11, 12 and 13, 14. Positioned in these guide slots are the corresponding ball or roller bearings 20, which are attached to the end sections 18, 19 of the meshing pin 17. Middle section 21 of the meshing pin 17 is held in the feed element 22. The latter has at least in part a circular cross section; the feed element is flattened out on its sides that face the ball or roller bearings 20.

The following section briefly explains the functioning of the rotary adjusting device in accordance with the invention on the basis of the figures.

By means of the actuator device 25, through its operating element 24, the feed element 22 can be moved in the longitudinal direction (15) of the rotary adjusting device 1. When the feed element is moved, the meshing pin 17 that it holds is moved correspondingly. The end sections 18, 19 of the latter are encircled by ball or roller bearings 20 and guided in guide slots 11 to 14. The guide slots 11 and 12 in the rotary sleeve 4 and the guide slots 13, 14 in the bearing sleeve 5 are arranged in pairs, with pairs of guide slots 11, 12 and 13, 14 lying diametrically opposite each other. The guide slots 11, 14 are formed in circumferential surfaces 9, 10 of the respective sleeves 4, 5. The guide slots 13, 14 run in a straight line and essentially parallel to the longitudinal direction 15, and the guide slots 11,12 run diagonally to the guide slots 13, 14 and in particular in a spiral pattern. When the meshing pin 17 is moved along the linear guide slots 13, 14, the simultaneous meshing with the spiral-patterned guide slots 11,12 causes the rotary sleeve 4, as the adjusting element 3, to be rotated around the longitudinal direction 15 by a certain angel.

The rotary sleeve 4 is intended as an adjusting element for a valve body which is not shown, and a corresponding rotation of the rotary sleeve is translated into a rotation of the valve body and thus into an opening or closing of the valve.

To support a return of the adjusting element 3 into the end position of the spring bearing sleeve 34 shown in FIGS. 1 and 2, there is a compression spring 33 between the ring flange 30 of the closing ring 29 and the terminating flange 37 of the spring bearing sleeve 34. The spring bearing sleeve 34 is carried along when the meshing pin 17 is moved in the direction of the closing ring 29; the ends 35, 36 of the meshing pin are in contact with ends 41, 42 of the longitudinal slots 39, 40 which are formed in the spring bearing sleeve 34.

The invention claimed is:

1. A rotary adjusting device comprising:
    an operating element coupled to an electro motor and operable to linearly translate in response to rotation of said electro motor;
    an adjusting element coupled to said operating element, wherein said adjusting element comprises a rotary sleeve mounted so that it can rotate relative to a bearing sleeve;
    at least one transmission adapted to translate a linear motion into a rotary motion, wherein the rotary sleeve and the bearing sleeve each have at least one guide slot in their circumferential surfaces, one of which runs essentially in a straight line and the other essentially diagonally to the longitudinal direction of the sleeves; and a meshing element, such as a meshing pin, which engages both slots and runs perpendicular to the longitudinal direction of the rotary adjusting device.

2. The rotary adjusting device in accordance with claim 1, further comprising ball and/or roller bearings between the rotary sleeve and the bearing sleeve.

3. The rotary adjusting device in accordance with claim 1, wherein the guide slots in the rotary sleeve and bearing sleeve are arranged facing each other in the circumferential surfaces of the rotary sleeve and bearing sleeve.

4. The rotary adjusting device in accordance with claim 3, wherein the guide slots are formed in pairs in the rotary sleeve and guide sleeve, and each pair of guide slots in the respective sleeve lie diametrically opposite each other in the circumferential surfaces.

5. The rotary adjusting device in accordance with claim 4, wherein the guide slots are essentially the same length when projected on the longitudinal direction of the sleeves.

6. The rotary adjusting device in accordance with claim 5, wherein the guide slots run in a spiral pattern in the rotary sleeve.

7. The rotary adjusting device in accordance with claim 1, wherein the meshing pin has two end sections, both of which engage the guide slots, which lie opposite each other, in both the rotary sleeve and the bearing sleeve.

8. The rotary adjusting device in accordance with claim 7, wherein the meshing pin is encircled by ball and/or rotary bearings in the area of the guide slots.

9. The rotary adjusting device in accordance with claim 8, wherein the meshing pin is held essentially in its middle section, so that it cannot turn, in a feed element which is mounted so that it can be moved along a longitudinal bore in the rotary sleeve.

10. The rotary adjusting device in accordance with claim 9, wherein the feed element and longitudinal bore have at least in part a circular cross section.

11. The rotary adjusting device in accordance with claim 10, wherein the feed element can be removably connected to an activating element of an actuator device.

12. The rotary adjusting device in accordance with claim 11, wherein the bearing sleeve comprises a ring flange extending outward radially on at least one attaching end, which can be removably connected to a connecting end of the actuator device.

13. The rotary adjusting device in accordance with claim 12, wherein opposite the attaching end, a closing ring with a ring flange, which extends outward radially, is removably attached to the bearing sleeve.

14. The rotary adjusting device in accordance with claim 13, wherein between the rotary sleeve and the closing ring, there is at least one thrust bearing to axially fix the rotary sleeve relative to the bearing sleeve.

15. The rotary adjusting device in accordance with claim 14, further comprising at least one thrust bearing between the ring flange of the bearing sleeve and the rotary sleeve, and/or between the connecting end of the actuator device and the rotary sleeve.

16. The rotary adjusting device in accordance with claim 15, wherein the meshing pin and/or the feed element is subjected to force in the direction of the ring flange of the bearing sleeve.

17. The rotary adjusting device in accordance with claim 16, further comprising at least one spring element located in or on the rotary adjusting device to apply force.

18. The rotary adjusting device in accordance with claim 17, wherein the spring element is located and operates between the ring flange and the meshing pin.

19. The rotary adjusting device in accordance with claim 18, further comprising a spring bearing sleeve placed in the longitudinal direction on the bearing sleeve, which spring bearing sleeve is engaged by the ends of the meshing pin, and which has a terminating flange which extends outward radially, between which terminating flange and the ring flange of the closing ring there is a compression spring as spring element.

20. The rotary adjusting device in accordance with claim 19, wherein the terminating flange is in contact with the ring flange of the bearing sleeve in one end position of the spring bearing sleeve.

21. The rotary adjusting device in accordance with claim 20, wherein the spring bearing sleeve has two longitudinal slots which are open in the direction of the terminating flange, which are engaged by the ends of the meshing pin and which is in contact with the slot ends which are opposite the terminating flange.

22. A rotary adjusting device comprising:
an electro motor;
an operating element coupled to said electro motor and operable to linearly translate in response to rotation of said electro motor;
an adjusting element coupled to said operating element and operable to rotate in response to linear translation of said operating element;
a transmission coupled to said operating element and said adjusting element, wherein said transmission is operable to convert linear translation of said operating element into rotation of said adjusting element, wherein said transmission further comprises:
a pin coupled to said operating element and arranged perpendicular to the longitudinal axis of said operating element; and
a first slot disposed in a rotary sleeve of said adjusting element, wherein said slot runs diagonally to the longitudinal axis of said adjusting element, wherein said pin is engaged with said first slot.

23. The rotary adjusting device of claim 22 further comprising:
a ball screw coupled to said electro motor and said operating element, wherein said ball screw is operable to convert rotation of said electro motor into linear translation of said operating element.

24. The rotary adjusting device of claim 22 wherein said ball screw further comprises:
a ball nut coupled to said electro motor so as to rotate in unison with said electro motor, wherein said ball nut is axially fixed relative to said electro motor; and
a ball spindle engaged with said ball nut so as to linearly translate relative to said ball nut when said ball nut is rotating, wherein said ball spindle is coupled to said operating element.

25. The rotary adjusting device of claim 22 wherein said first slot runs diagonally to the longitudinal axis of said adjusting element in a spiral pattern.

26. The rotary adjusting device of claim 22 wherein said transmission further comprises:
a bearing sleeve having a second slot that runs parallel to the longitudinal axis of said bearing sleeve, wherein said pin is engaged with the second slot;
said bearing sleeve being coaxial with and rotatable relative to said rotary sleeve.

27. The rotary device of claim 22 wherein said transmission further comprises a spring operable to urge said pin to one end of the first slot.

* * * * *